Nov. 21, 1944.  J. M. FRANKS  2,363,172
TRUCK BODY MOUNT
Filed June 5, 1943

J. M. Franks
INVENTOR.

BY
ATTORNEYS.

UNITED STATES PATENT OFFICE 2,363,172

TRUCK BODY MOUNT

John M. Franks, Joplin, Mo.

Application June 5, 1943, Serial No. 489,823

1 Claim. (Cl. 296—35)

This invention relates to motor vehicle frame construction, and particularly to the construction of truck frames, the primary object of the invention being to provide means whereby a truck body or truck floor may be drawn into close engagement with the truck chassis, should the body or floor become loose on the chassis, due to twisting of the truck frame, caused by the truck passing over irregular road surfaces, thereby reducing side sway of the truck body, to a minimum.

An important object of the invention is to provide means whereby bodies and truck frames may be dismounted for shipment, and readily assembled by persons unfamiliar with mechanics, thereby greatly conserving shipping space.

Still another object of the invention is to provide a truck chassis including the usual channel bars, on which wooden sills are mounted, the wooden sills providing shock absorbing means between the truck chassis and frame or floor supported thereon.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
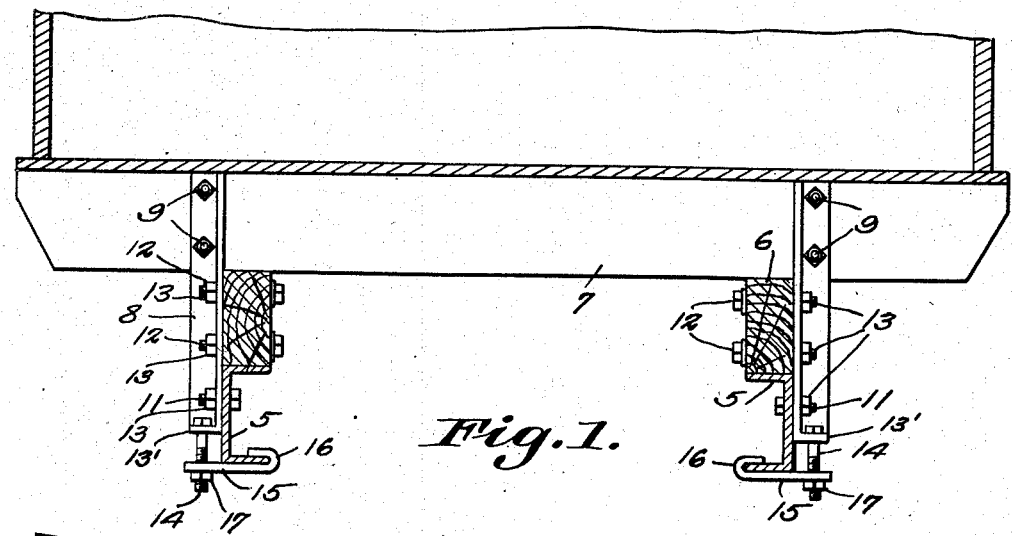
Figure 1 is a vertical sectional view through a truck chassis and body, illustrating the connecting means forming the subject matter of the present invention, as mounted thereon.
Figure 2:
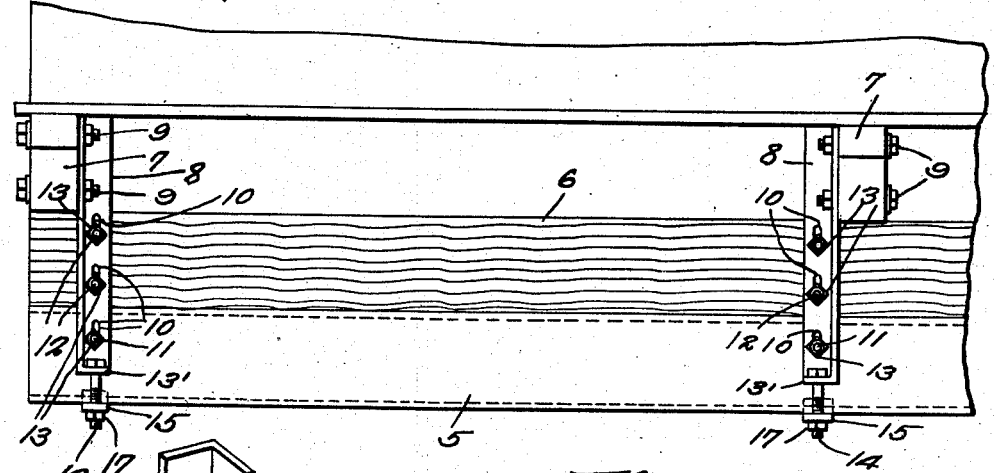
Figure 2 is a side elevational view thereof.
Figure 3:
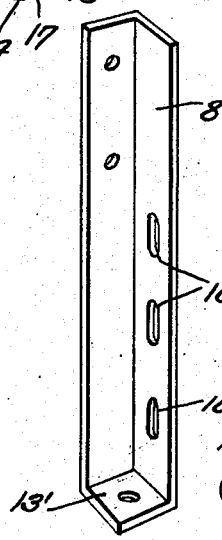
Figure 3 is a perspective view of the hanger bar providing the connection between the truck body and chassis.
Figure 4:
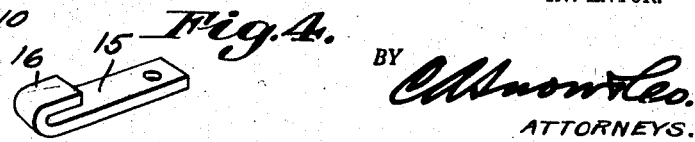
Figure 4 is a perspective view of the coupling used between the side rails of the chassis of the truck, and connecting bolts of the device.

Referring to the drawing in detail the reference character 5 designates the usual channel bars, constituting the side rails of the chassis of a truck. Mounted on the upper flanges of the channel bars 5, are wooden sills 6 which extend throughout the lengths of the channel bars and on which the flooring of the truck body rests, as clearly shown by Figure 1 of the drawing.

The cross sills 7 of the truck body floor are shown as resting directly on the sills 6, the ends of the cross sills extending appreciable distances beyond the wooden sills 6. The connecting means between the channel bars 5 of the truck chassis and the body, constitute vertical angle bars 8 which have their open sides facing outwardly, one of the flanges of each angle bar being formed with bolt openings for the reception of the bolts 9 that extend through openings in the cross sill 7 associated therewith. The opposite flanges of the angle bars are formed with a plurality of elongated openings 10 arranged in vertical spaced relation with respect to each other and elongated in a direction longitudinally of the angle bars. The lowermost elongated openings 10 of the angle bars fall opposite to the central webs of the channel bars 5, where they receive the bolts 11 that pass through the channel bars.

The upper elongated openings of the angle bars fall opposite to the wooden sill 6, where they accommodate the bolts 12, the bolts 11 and 12 being provided with nuts 13, so that they may be securely tightened after an adjustment has been made.

At the lower end of each angle bar 8 and secured to both angle plates of the angle bar, is a flange 13' that is disposed horizontally and provided with an opening to receive the bolt 14, associated therewith.

These bolts 14 pass through openings in the clamps 15 that are formed with hooks 16 at their inner ends, the hooks 16 being positioned over the lowermost flanges of the channel bars 5 of the chassis, securing the clamps in position. These clamps 15 are rectangular in shape and are of length to extend appreciable distances beyond the outer surfaces of the channels 5, where they are also provided with openings that align with the openings in the flanges 13' for the reception of the bolts 14 which are shown as extending therethrough. Nuts 17 are mounted on the bolts 14 and act to draw the angle bars downwardly towards the clamps 15 in securing the truck body to the truck chassis.

From the foregoing it will be seen that due to the construction shown and described, should the truck body become loose on the chassis, it is only necessary to loosen the bolts 12 and tighten the nuts 17. The body is now drawn downwardly into binding relation with the wooden sills 6. The nuts 17 are now tightened to further secure the angle bars 8 against movement.

It will further be seen that because of applicant's structure, the body may be readily dismounted from the chassis to facilitate storing, and may be readily replaced, by persons unfamiliar with mechanics. The structure also provides means whereby the usual all metal truck chassis and frame may be cushioned with respect to the body mounted thereon through the wooden sills 6, for reducing strain and vibration directed to the load, to the minimum.

What is claimed is:

In combination with the channel bars forming the side rails of a motor vehicle chassis, and the cross sills of the body, means for mounting the body on the chassis, comprising angle bars fitted against the cross sills and side rails of the chassis, means for securing the angle bars to the cross sills, said angle bars having elongated openings disposed adjacent to the side rails of the chassis, bolts extending through the side rails of the chassis and passing through the elongated openings, adjustably connecting the angle bars to the chassis, horizontal flanges connecting the lower ends of the flanges of the angle bars, adjusting bolts extending through the horizontal flanges of the angle bars, and clamps connected with the chassis side rails and through which said adjusting bolts extend connecting the angle bars and clamps, and said adjusting bolts adapted to operate to draw the angle bars and body connected therewith, towards the chassis.

JOHN M. FRANKS.